US012183141B1

(12) United States Patent
Maciolek et al.

(10) Patent No.: US 12,183,141 B1
(45) Date of Patent: Dec. 31, 2024

(54) REMOTE ACCESS SYSTEM FOR SAFETY DEPOSIT BOXES

(71) Applicant: UIPCO, LLC, San Antonio, TX (US)

(72) Inventors: Michael J. Maciolek, Kerrville, TX (US); Carol Lyn Lawrence, Fair Oaks Ranch, TX (US); Gregory Brian Meyer, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 122 days.

(21) Appl. No.: 18/082,649

(22) Filed: Dec. 16, 2022

Related U.S. Application Data

(60) Provisional application No. 63/290,748, filed on Dec. 17, 2021.

(51) Int. Cl.
G07C 9/00 (2020.01)
B25J 11/00 (2006.01)
B25J 19/02 (2006.01)

(52) U.S. Cl.
CPC ......... *G07C 9/00912* (2013.01); *B25J 11/008* (2013.01); *B25J 19/023* (2013.01); *G07C 9/00571* (2013.01)

(58) Field of Classification Search
None
See application file for complete search history.

(56) References Cited

U.S. PATENT DOCUMENTS

| | | | | |
|---|---|---|---|---|
| 9,120,622 | B1* | 9/2015 | Elazary | B66F 9/07 |
| 9,561,941 | B1* | 2/2017 | Watts | G05D 1/0268 |
| 10,022,867 | B2* | 7/2018 | Saboo | G06Q 10/08 |
| 10,875,174 | B2* | 12/2020 | Skaaksrud | G06Q 10/0836 |
| 11,383,388 | B2* | 7/2022 | Vain | G06Q 50/40 |
| 11,900,747 | B2* | 2/2024 | Skaaksrud | B25J 9/1666 |
| 2018/0165638 | A1* | 6/2018 | Wilkinson | G06F 21/32 |
| 2023/0267411 | A1* | 8/2023 | O'Connor | G01G 19/52 |
| | | | | 705/28 |

* cited by examiner

Primary Examiner — K. Wong
(74) Attorney, Agent, or Firm — Plumsea Law Group, LLC

(57) ABSTRACT

A safety deposit box facility that allows for 24/7 remote access by authorized personnel to their safety deposit boxes via an on-site robot. The facility includes safety deposit boxes that can be opened along one side by the robot, and on the other side by the authorized person. In some embodiments, the authorized person may request a remote access event in which they can view the contents of their safety deposit box via a camera associated with the robot, and/or request a secure delivery of one or more items disposed in their safety deposit box.

20 Claims, 12 Drawing Sheets

REMOTE ACCESS SYSTEM FOR SAFETY DEPOSIT BOXES

CROSS-REFERENCE TO RELATED APPLICATION

This application claims the benefit of U.S. Provisional Patent Application Ser. No. 63/290,748 filed on Dec. 17, 2021 and titled "Remote Access System for Safety Deposit Boxes", the disclosure of which is incorporated by reference herein in its entirety.

TECHNICAL FIELD

This disclosure relates generally to systems for facilitating access to safety deposit boxes from remote locations, and more particularly to providing remote access to the contents of a safety deposit box by use of a remote controlled robotic mechanism.

BACKGROUND

Personnel who are stationed, assigned or deployed to work in remote areas may need to nevertheless have ready access to important documents and/or valuables while stationed, assigned or deployed in those areas. Specifically, such personnel would need, on the one hand, to know that their important documents and/or valuables are securely stored while, on the other hand, would need to have ready access to those documents and/or valuables. In areas with a sufficient number of permanent concentrations of inhabitants who need to store their important documents and/or valuables, these needs may be met by institutions such as banks that make safety deposit boxes available to their customers in facilities under their control. However, in remote areas, such facilities may not exist, or may not be available to serve the needs of persons who are only temporarily in a particular remote location.

Furthermore, in cases where safety deposit owners are at a distance from their selected safety deposit box (SDB) facility, there may be times when there is cause to examine the contents of the SDB or have the contents in their possession. Currently, owners must return to the physical location of the SDB facility in order to perform these tasks.

For these reasons, there is a need for systems that enable access to the contents of SDBs without requiring the physical presence of the owner.

SUMMARY

In one aspect, embodiments include a method for providing remote access to contents of a safety deposit box. The method includes a first step of receiving, at a server and from a remote computing device, a first command to initiate a remote access event of the safety deposit box, and a second step of transmitting, from the server, the first command to a robot located in the same room as the safety deposit box, thereby causing the robot to approach the safety deposit box. The method further includes a third step of opening, via the robot, a first door of the safety deposit box in further response to the first command, and a fourth step of receiving, at the server and from a camera mounted on the robot, first image data of the contents of the safety deposit box. A fifth step includes transmitting, from the server and to the remote computing device, the first image data.

In another aspect, embodiments include a safety deposit box facility with at least a first safety deposit box including a first door that, when opened, provides access to contents of the first safety deposit box, a robot configured to receive a first remote command that causes the robot to unlock the first safety deposit box, open the first door, and retrieve the contents therein, and a camera mounted on the robot configured to capture and transmit real-time image data from the facility to a remote computing device.

In yet another aspect, embodiments include a system for providing remote access to contents of a safety deposit box includes a processor and machine-readable media including instructions which, when executed by the processor, cause the processor to receive, at a server and from a remote computing device, a first command to initiate a remote access event of the safety deposit box, and to transmit, from the server, the first command to a robot located in the same room as the safety deposit box, thereby causing the robot to approach the safety deposit box. The instructions further cause the processor to open, via the robot, a first door of the safety deposit box in further response to the first command, and to receive, at the server and from a camera mounted on the robot, first image data of the contents of the safety deposit box. In addition, the instructions cause the processor to transmit, from the server and to the remote computing device, the first image data.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

The proposed embodiments describe a system and method for remote access of security deposit box (SDB) or other physical containers. In one example, the system could be implemented by a secure institution (such as a bank) that would install a wall of SDBs in a secure location. The SDBs would be accessible from two opposing sides. The first (front) side of the boxes would be accessible along a wall of an enclosed room, serving as the traditional experience for users accessing an SDB in a bank. However, the second (back) side of these same boxes would be accessible to a robotic device ("robot") that is disposed on the other side of the same wall. This robot could receive remote commands from users that want to retrieve items from their SDB in order to either have them inspected and/or shipped. In one embodiment, a camera system could be used to monitor the robots and ensure they are only accessing boxes when requested by authorized parties. In some embodiments, the robot is provided with physical keys of some kind to access the box in the same manner that each person has a key for accessing their box.

Figure 1:
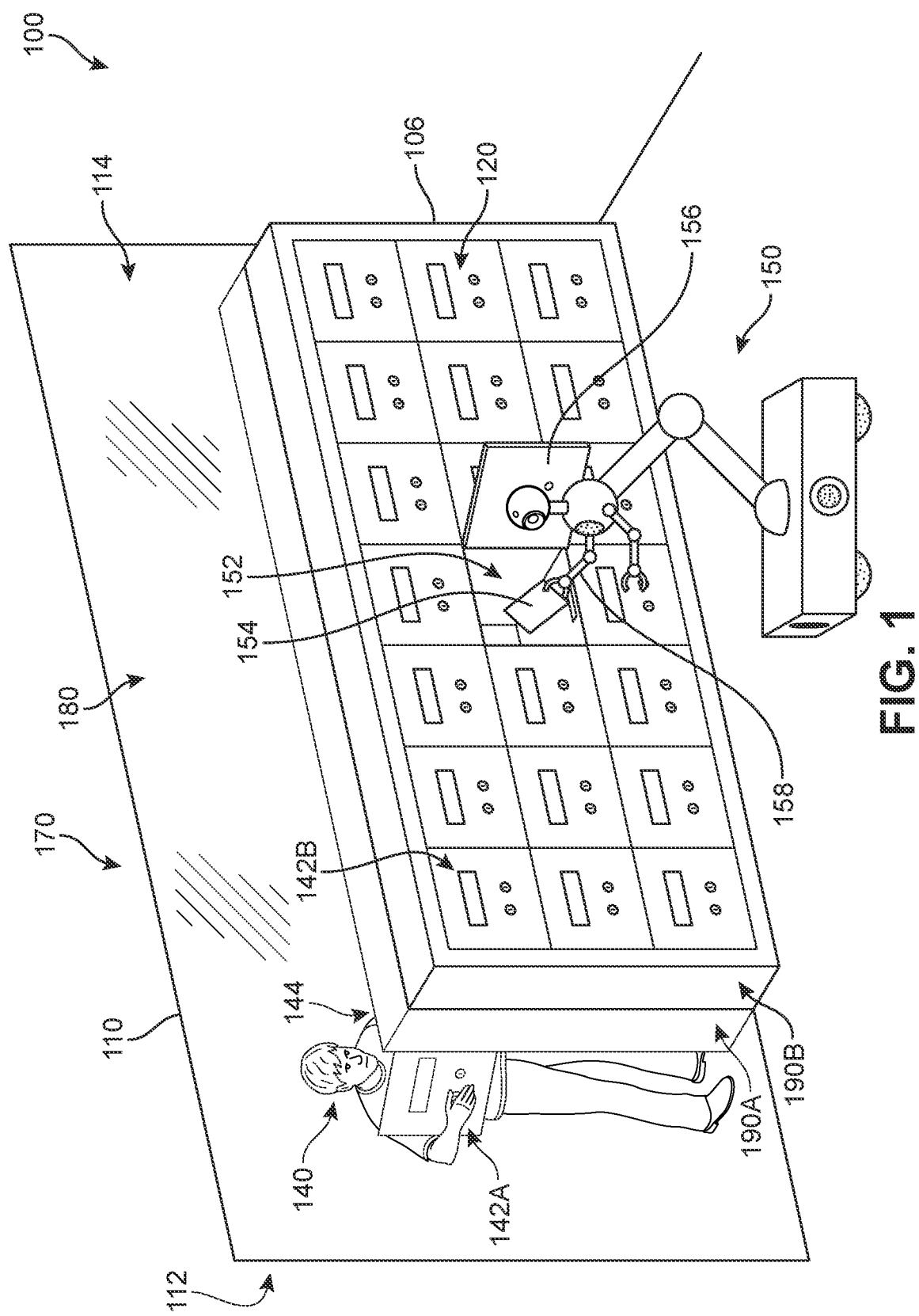
FIG. 1 is a depiction of a user accessing their safety deposit box at an SDB facility from one side while a robot accesses contents of another safety deposit box on the opposite side, according to an embodiment.

For purposes of clarity, an overview of one embodiment of the proposed systems and methods is illustrated with reference to FIG. 1. In FIG. 1, an interior space of a secure building 100 houses an SDB installation 106. The SDB installation 106 includes a plurality of SDBs 120, arranged in row(s) and/or column(s), similar to conventional banking SDB locations. Typical SDB installations are disposed entirely in one room. However, in this case, the SDB installation 106 can be understood to bisect or be 'split' among two rooms or spaces. As shown in FIG. 1, a wall 110—which may be an entire wall or a portion thereof—has a cavity or opening through which the SDB installation 106 is disposed or extends. In different embodiments, the SDB installation 106 can include a first side 190a and an opposing second side 190b (collectively referred to as sides 190). Each side is demarcated by the boundary of the surrounding edge of wall 110 as it extends around a portion of the perimeter of the SDB installation 106.

For purposes of convenience, wall 110 is depicted as transparent in the drawings. However, it should be understood that in different embodiments, the wall 110 can be a standard or conventional non-transparent wall which does not allow viewing of one side from the opposing side. In this example, a first user 140 has approached the first side 190a of the SDB installation 106 to open a first box 144, for example, using her own key or another authentication token or code such as a fingerprint or passkey. The first user 140 is in what will be referred to as an exterior room 170 (relative to wall 110) that includes an outer side 112 of wall 110. It should be understood that the wall 110 forms part of an enclosed space, such that the second side 190b cannot be accessed from the first side 190a, nor the first side 190a from the second side 190b. Thus, the two sides can be associated with different levels or types of security and visibility.

As the first user 140 opens an exterior door 142a of the first box 144, she is able to access the contents of the first box 144. At the same time, it can be seen that the opposing end of the first box 144 is disposed along an interior room 180 (relative to wall 110) that includes an inner side 114 of the same wall 110. The opposing end also serves an access point to the same box contents, via what will be referred to as a first interior door 142b. In other words, in some embodiments, the first box 144 has a three-dimensional shape of a rectangular prism where two opposing faces are doors that are configured to open to allow access to the space bounded by the remaining four sides. In other embodiments, the first box 144 can have other three-dimensional shapes, such as a cylindrical or other regular shape, but will invariably include two ends that serve as access panels.

In different embodiments, the arrangement depicted enables the contents of each SDB to be accessible from either the exterior room 170 or the interior room 180, while each side remains inaccessible from the opposing side. In other words, accessing the first box 144 using the first interior door 142b and accessing the first box 144 using the exterior door 142a must occur from two separate rooms that are each separately secured. Someone (or something) who can access the exterior room 170 may not be able to access the interior room 180, while in some embodiments, someone (or something) who can access the interior room 180 may not be able to access the exterior room 170. Thus, the restrictions applied that prevent or permit access to either of the first side 190a and second side 190b can differ.

Along the second side 190b in the interior room 180, another 'occupant' is depicted-shown here as a first robot 150. The first robot 150 includes provisions to move along the second side 190b of the SDB installation 106 among the plurality of SDBs 120, as well as provisions to open and/or close the interior doors of each SDB and the ability to interact with the contents inside of each SDB. For purposes of this example, the first robot 150 is positioned near a second box 152, and has opened a second interior door 156 of the second box 152. Furthermore, using a robotic arm 158, the first robot 150 is now interacting or otherwise reaching for a first item 154 disposed in the second box 152. In other words, in some embodiments, while human visitors may access their respective SDBs from the exterior room 170, the same human visitors are restricted from entering the interior room 180. At the same time, the first robot 180 'resides' or is stationed near or in the interior room 180 and is configured to access the same SDBs from the opposing side.

Figure 2A:
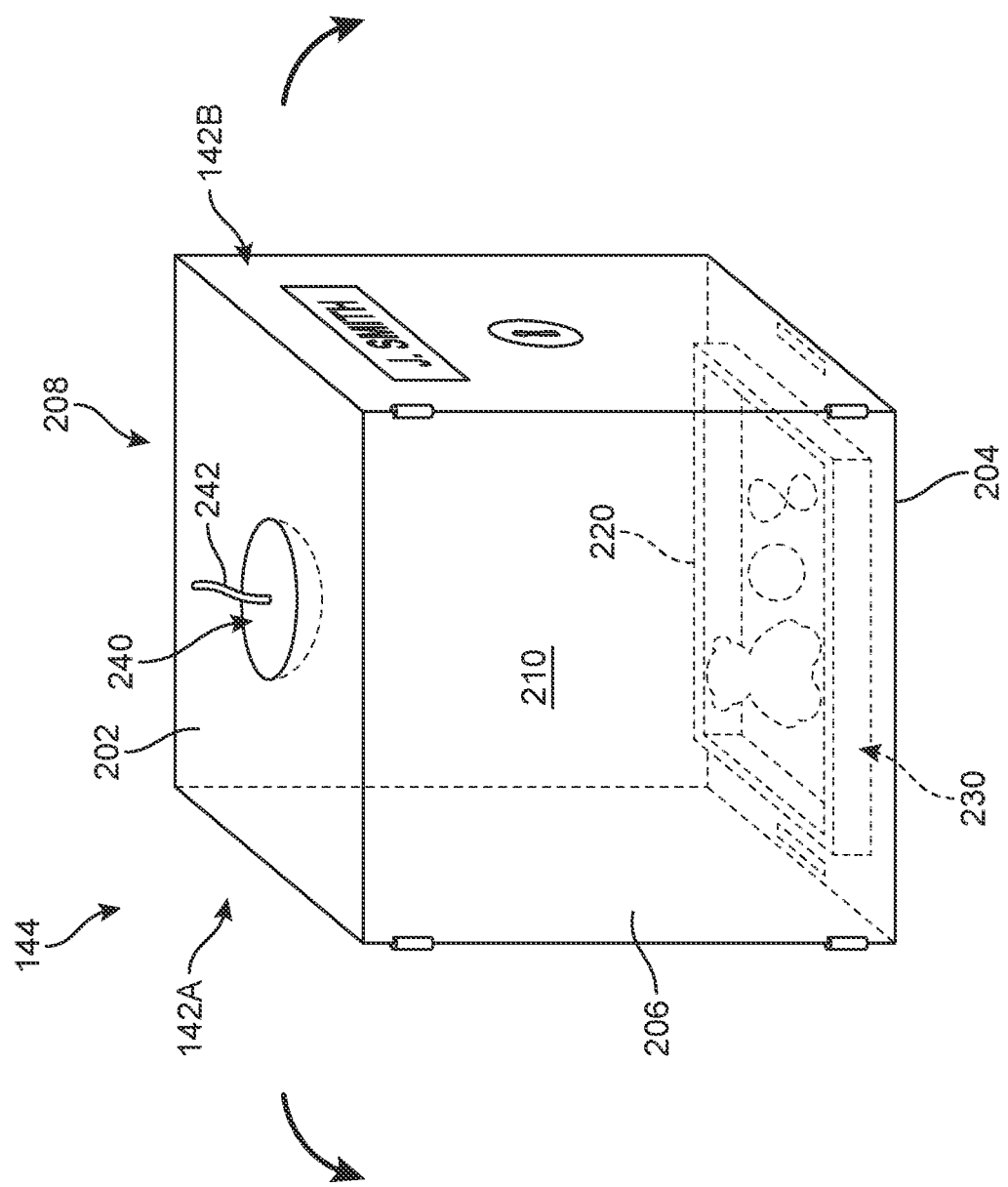
FIGS. 2A and 2B depict one example of a safety deposit box for use in the SDB facility described herein, according to an embodiment.
Figure 2B:
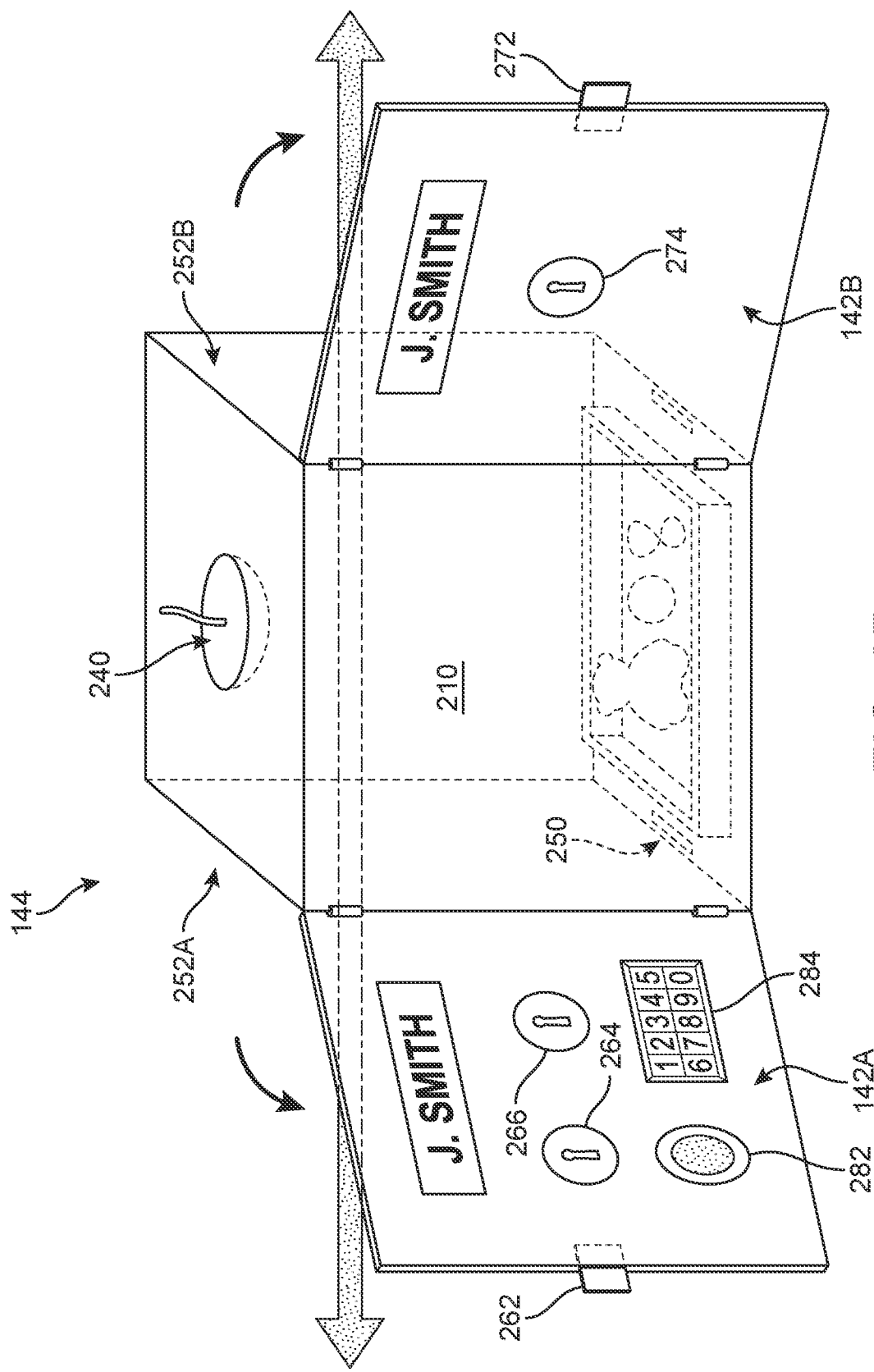

For purposes of clarity, FIGS. 2A and 2B illustrate an isolated view of the first box 144. FIG. 2A presents a closed state of the first box 144, where both exterior door 142a and interior door 142b are secured and an interior chamber 210 of the first box 144 is contained by the surfaces provided by the two doors and a first face 202, a second face 204, a third face 206, and a fourth face 208. In this example, the chamber 210 includes a tray 220 in which a plurality of items 230 is stored (e.g., a necklace, document, key, etc.). In some embodiments, the first face 202 (representing the top surface of the box) can include an optional device 240, connected by wiring 242 to provide a power supply and, in some cases, a network connection. In other embodiments, the device 240 can be wirelessly connected to a network, while in still other embodiments, the device 240 will have no network connection. In different embodiments, the device 240 can be configured to provide a variety of functions, including (a) camera, (b) motion sensor, (c) light source, (d) infrared sensor, (e) temperature sensor, (f) a range of IoT (Internet-of-Things) devices, and other such sensors or components.

In FIG. 2B, the exterior door 142a and interior door 142b of the same first box 144 have been opened. Thus, it can be understood that the two openings (first opening 252a and second opening 252b) are in fluid communication with one another, here schematically represented by the arrow extending across the chamber 210 and through both openings. In different embodiments, the first box 142 can include provisions to increase the security and/or surveillance available for the items stored in the chamber 210. In one embodiment, each door can be associated with a sensor 250 that is configured to detect and/or immediately trigger an alert when either door is opened. In some embodiments, the sensor 250 can be configured to relay a signal to a server, which can be further configured to transmit a message to the registered owner of the items stored in the box, such that any access of the SDB is recorded and known to the owner.

Figure 4:
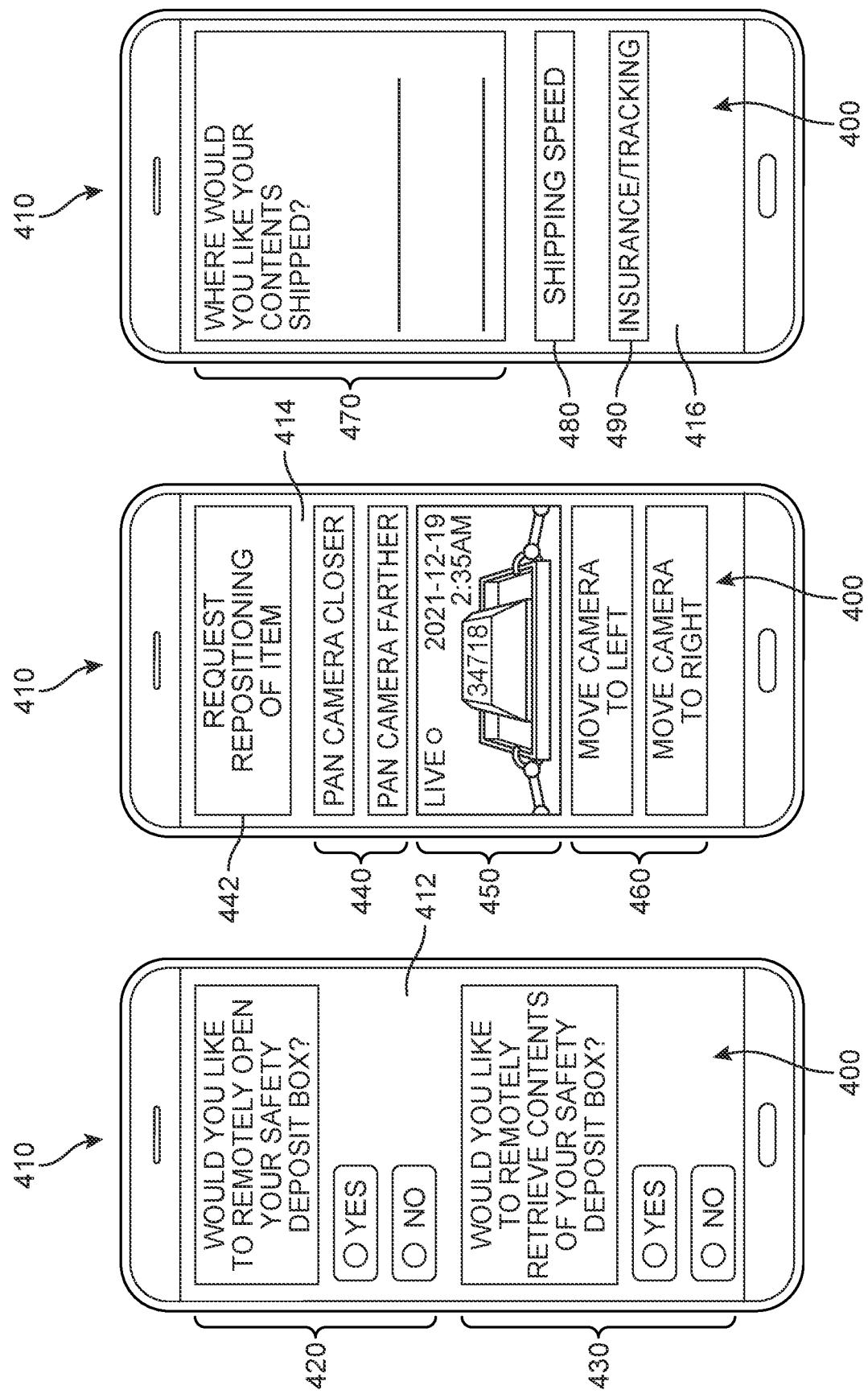
FIGS. 4A-4C are some non-limiting examples of options that may be offered by a software application associated with the safety deposit box system, according to an embodiment.

In another example, the device 240 can be configured to provide remote viewing access to a registered owner. Various components (light, camera, temperature sensors, etc.) can be managed by the registered owner via a mobile application (see FIGS. 4A-4C) that allows the user to view in real-time their contents, the conditions of contents, and/or a history in which all access events are logged. For purposes of this disclosure, an access event or access session occurs whenever a door for a safety deposit box is unlocked and/or opened. Thus, an access event/session refers to both local access (i.e., the owner is on site and opens the exterior door themselves) and remote access (i.e., the owner is off site and sends a request for the robot to open the interior door).

In different embodiments, the exterior door 142a can include one or mechanisms for locking and unlocking the exterior door 142a. Some examples are shown in FIG. 2B, where a first lock 264 (e.g., for the user's key) and a second key 266 (e.g., for the facility manager's key) can be used to release a first locking mechanism 262. In some other embodiments, biometric tokens may be used, such as a retinal scan, facial recognition scan, voiceprint authentication, etc. For purposes of this example, a fingerprint sensor 282 is shown on the outer surface of the exterior door 142a that can be used to unlock the first locking mechanism 262. In still other embodiments, a keypad 284 may be provided for the user to input a passcode for unlocking the door. In contrast, in some embodiments, a single type of mechanism for releasing a second locking mechanism 272 can be installed on the opposing interior door 142b, as it is understood that access to the interior door 142b will be restricted to a robotic device.

Figure 3:
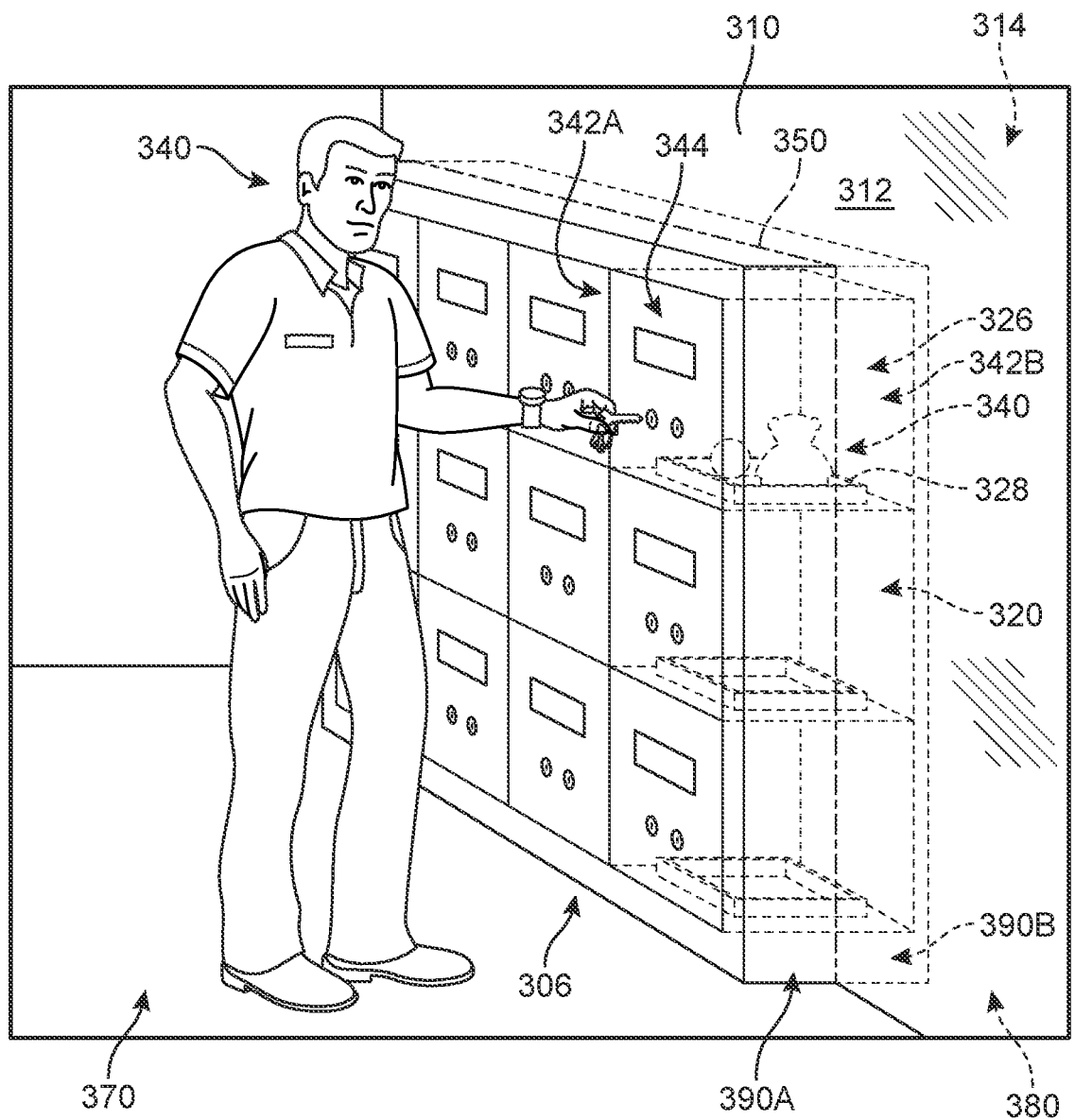
FIG. 3 is a depiction of a user locking their safety deposit box, according to an embodiment.

FIGS. 3-11 present an example of a process in which the proposed systems are implemented. In FIG. 3, a second user 340 is shown in a first room 370 next an SDB array 306 comprising a plurality of SDBs 320. The second user 340 may have already passed through one or more layers of authentication in order for the institution to confirm that the user is the person who has right of access to the security deposit box. In some embodiments, the system may also check the surrounding area to make sure that the person is the only one in the space, so that only one person may enter the facility at a time. For example, the system may use a wide-angle video camera to survey the immediate environment of the door to the facility. Also, in some embodiments, the user may be using his or her mobile device (such as a smartphone or tablet) to communicate with the server to let the server know that he or she is present at the door to the SDB facility.

For purposes of illustration, the SDB array 306 is shown in a cutaway view, revealing a portion of an interior of the assembly. The first room 370 is separated from another, second room 380 by wall or partition 310. In addition, partition 310 frames, surrounds, or otherwise extends around some of an outermost perimeter of the SDB array 306. In some embodiments, this partitioning can occur toward a midline 350 of the SDB array 306. In FIG. 3, the partition 310 is flush against the outer surface of the SDB array 306, forming a substantially continuous thickness from a first face 312 of the partition 310 to the SDB array 306 and also from a second face 314 of the partition 310 to the SDB array 306.

However, in other embodiments, the partitioning can be offset relative to the midline 350 in either direction, such that the wall is closer to a first side 390a of the SDB array 306 and further from a second side 390b, or vice versa. In some embodiments, the SDB array 306 can be positioned toward a center of the partition 310, such that all four sides of the SDB array 306 are framed by the partition 310. In other embodiments, SDB array 306 can be disposed against the floor, such that only three sides are framed by the partition 310. In still other embodiments, the SDB array 306 can be disposed against a corner of the wall, or extends from the ceiling to the floor, such that only two sides are framed by the partition 310. In yet another embodiment, there may be no wall, as the SDB array 306 takes up or encompasses the entirety of the space and itself serves as the barrier between the two rooms.

The second user 340 inserts a key into a first door 342a of a third box 344 to lock the third box 344. The first door 342a can be understood to be directly opposite to a second door 342b disposed in second room 380. In this case, second user 340 has deposited two items 344 in a tray 328 of a chamber 326 of the third box 344. At this point, the second user 340 may depart the secure premises on which the SDB array 306 is located.

Referring now to FIGS. 4A-4C, some non-limiting examples of user interfaces for remote access are illustrated. In the figures depicted, different examples of a user interface ("interface") are presented on a touchscreen display of a mobile device, offering content via native controls included in the interface. Throughout this application, an "interface" may be understood to refer to a mechanism for communicating content through a client application ("app") 400 to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In some embodiments (not shown in the drawings), the interface can include a welcome or header message(s), and/or a plurality of data input fields can also be presented. Some non-limiting examples of such fields can include options directed to identification of the account owner and other users (e.g., name, phone number, address), as well as security and login options. In addition, the interface can provide a plurality of selectable options, such as navigation options (e.g., "Back", "Save", "Next"), or additional menu options for accessing other features or aspects of the profile. As a general matter, it should be understood that the text and specific wording shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the user's system, including spaced apart from, adjacent to, or around the user interface. In other words, the figures present only one possible layout of the interface, and do not in any way limit the presentation arrangement of any of the disclosed features.

In FIG. 4A, a first menu 412 for app 400 is depicted that allows the user to request initiation of a remote access event to their SDB. For example, a first option 420 can be selected ("yes") to request that a robot open the box and view the contents via a camera associated with the robot (i.e., see the items through the robot's 'eyes'). In other embodiments, the first option 420 can alternatively be used to request remote viewing of the box chamber via a camera of a device installed in the SDB (see FIG. 2A). A second option 430 can be selected if the user wishes for the robot to not only open and 'look' at the interior of the box, but also remove the contents for further review.

In FIG. 4B, a second menu 414 is shown which may be presented following the user's request to open or remove the contents via the robot. For example, a third option 442 can open a new menu in which the user remotely controls some of the movements of the robot arm(s) to allow for a repositioning of the item(s) in the box, allowing the user to examine the item(s) from different angles. Similarly, a fourth option 440 requests that the camera for the robot move closer and/or zoom in or move farther and/or zoom out. A fifth option 450 similarly can be used to request that the camera move toward the left side or to toward the right side.

In addition, in some embodiments, a real-time image capture and display 450 (e.g., snapshots or streaming video) can be presented to the user during their interactions with menu options. The display 450 can be a substantially continuous stream that reflects the dynamics of the user's choices as he/she remotely controls their interaction experience via the robot. In this case, the user is able to read a sequence of numbers (34718) engraved on their item, which may verify the item's authenticity. In some embodiments, a wide-angle video camera installed in the second room 380 captures images of the interior of the room. The system may use the captured images to ensure that the robot is the only entity in the room, and/or display the wide-angle view to the user via the app 400.

In FIG. 4C, a third menu 416 provides the user with a sixth option 470 to initiate a delivery of some or all of the contents of their box. For example, the user can identify via the display 450 (see FIG. 4B) by tapping the item they want, or moving the robot arm to the desired item, or simply selecting all items. The user can specify an address for shipping, as well as optional selections for shipping speed 480 and insurance/tracking options 490.

Figure 5:
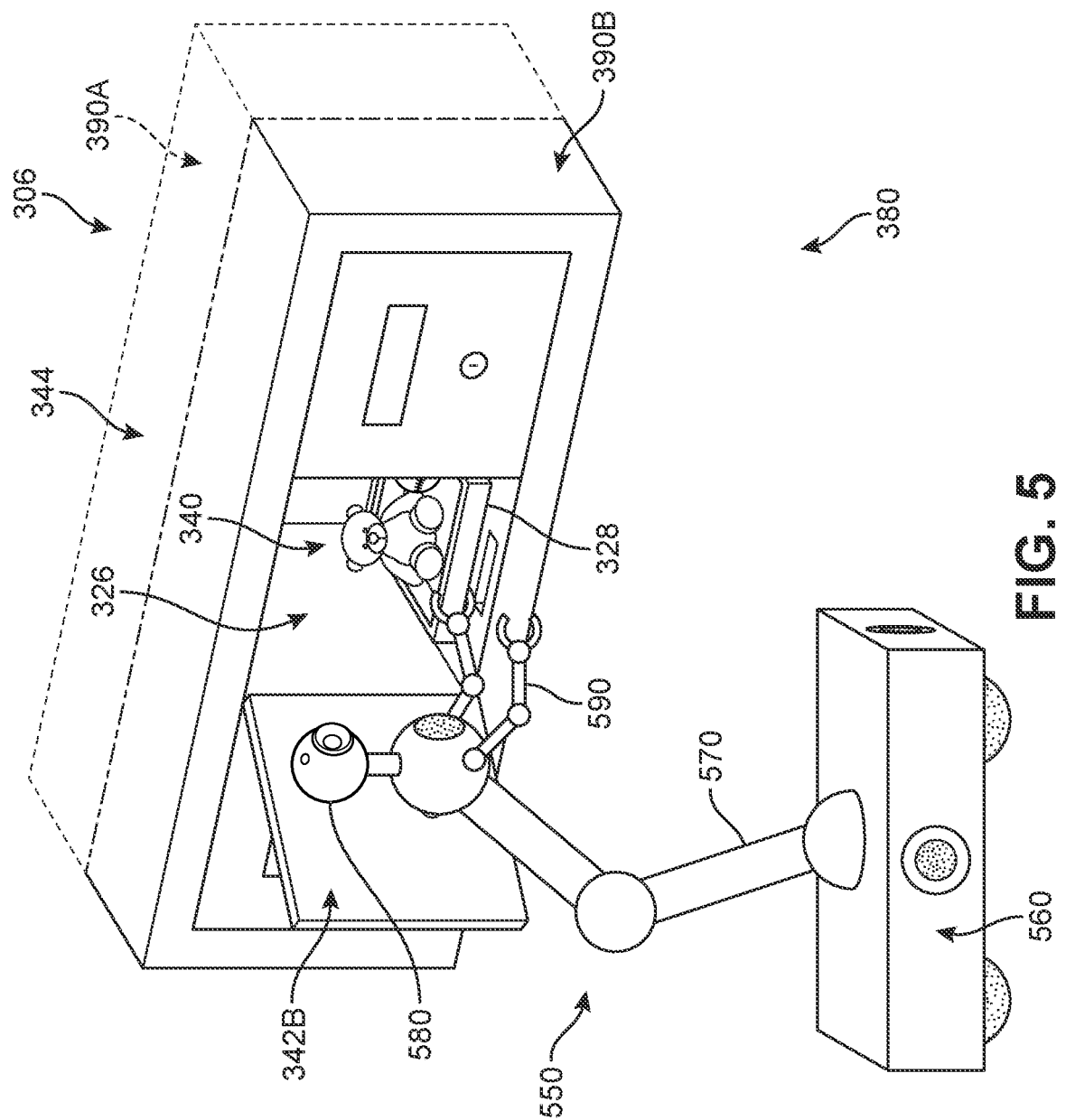
FIGS. 5 and 6 show a robot accessing and then retrieving contents of a safety deposit box in response to a remote command, according to an embodiment.

FIGS. 5-11 illustrate a sequence in which a second robot 510 is used to securely interact with contents of an SDB. In FIG. 5, it can be understood that the second user (see FIG. 3) has selected an option for the second robot 510 to remove the contents of the third box 344. This selection is transmitted to the second robot 510 as a command via the server. Entry into the second room 380 by the second robot 510 may be controlled remotely via a server at the home bank or other institution. For example, a specific user may submit a request for remote access to his or her safety deposit box to the server using his or her laptop or mobile device. The server may then schedule an appointment for the specific user at a time that is convenient to the specific user and has not been allocated to another user.

In different embodiments, the second user 340 can requests that he or she be allowed to remotely 'enter' the second room 380. For example, referring briefly to FIG. 12, a user may submit this request to a remote server (server 1202 shown in FIG. 12 for example) over a communications medium such as the Internet using a computing device 1208 such as a smartphone. Mobile device 1208 may communicate with secured access robotic system 1206 using near field communication (NFC) technology, radio, or other signaling mechanisms. The user may be asked to first verify his or her identity, by, for example, entering a PIN or a VIP code into the app (see FIGS. 4A-4C). A code may be generated for use by the robot to open the SDB. The user's identity may also or alternatively be verified by a biometric scanner associated with their computing device, which could include, for example, using facial recognition based upon the user's facial features, voice recognition based upon a voiceprint of the user, a retinal scan and/or fingerprint identification.

Thus, the second robot 510, which resides in or otherwise has access to the second room 380 has approached the second side 390b of the third box 344 using a remote controlled machine 560 for traveling through the room, such as a rover or glider. The robot will include provisions for moving its one or more arms 590 to the appropriate box, and will typically be configured with three to seven degrees of freedom for each arm. In other embodiments, the robot can instead be anchored from a ceiling or other location while still operating with three to seven degrees of freedom for each arm.

In some embodiments, the second robot 510 may be provided with a one-time or otherwise temporary passcode to open the third box 344, or have a mechanical (tangible) key which it can insert into a lock formed on the second door 342b to open the third box 344 using its arms 590. In still another embodiment, the SDB can be configured with an unlock mechanism that can be triggered from a central system that responds to signals sent from the server.

Figure 6:
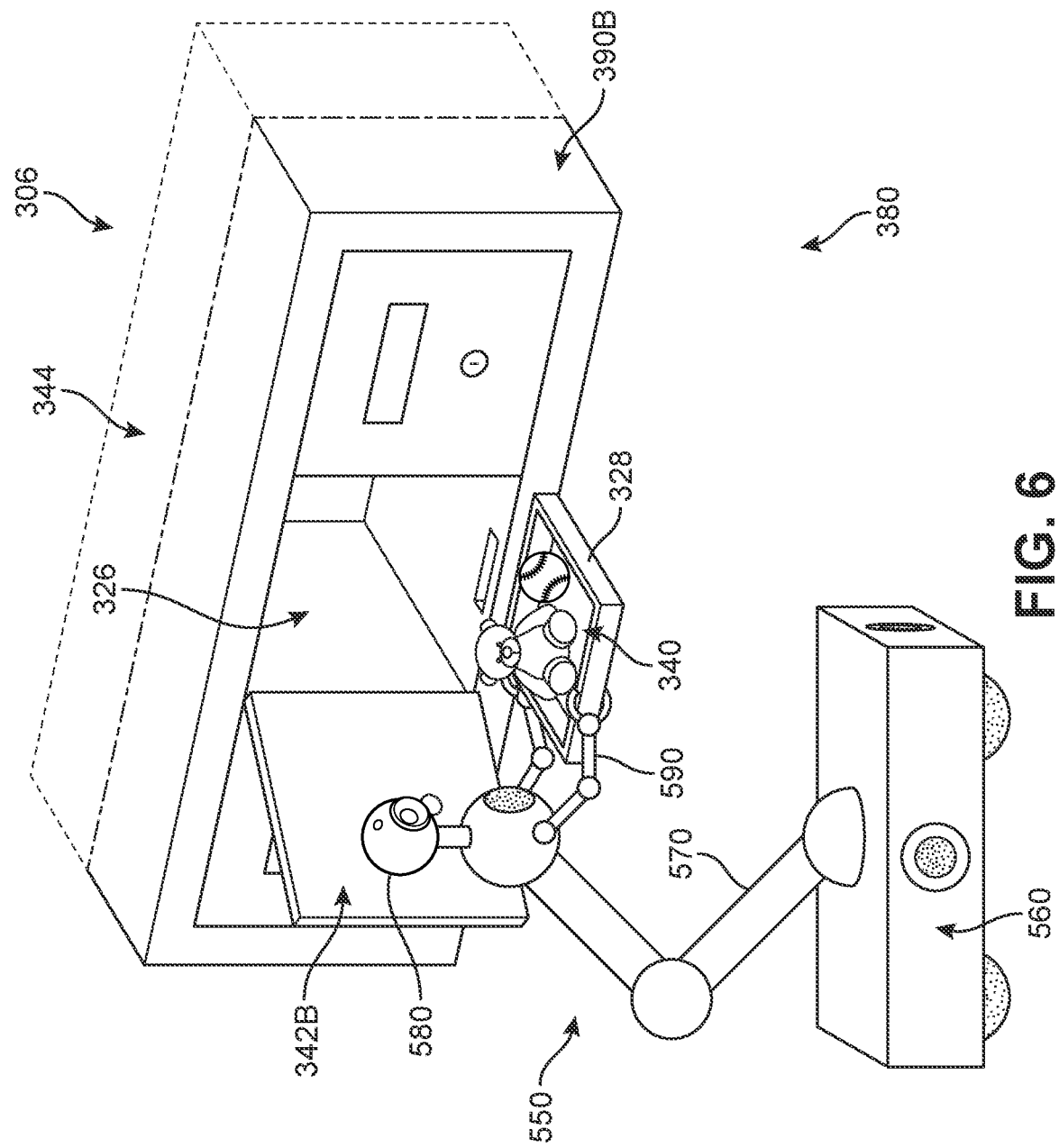

In FIG. 6, the second robot 510 has grasped and removed the tray 328 on which the items 340 are disposed from the chamber 326 of the third box 344, emptying the third box 344. In other embodiments, there may be no tray, and one or more items in the box can be manually retrieved by the robot's arms as selected by the user. During the operations shown in both FIGS. 5 and 6, image recording and/or streaming may occur to permit the user to witness the retrieval of contents in real-time.

Figure 7:
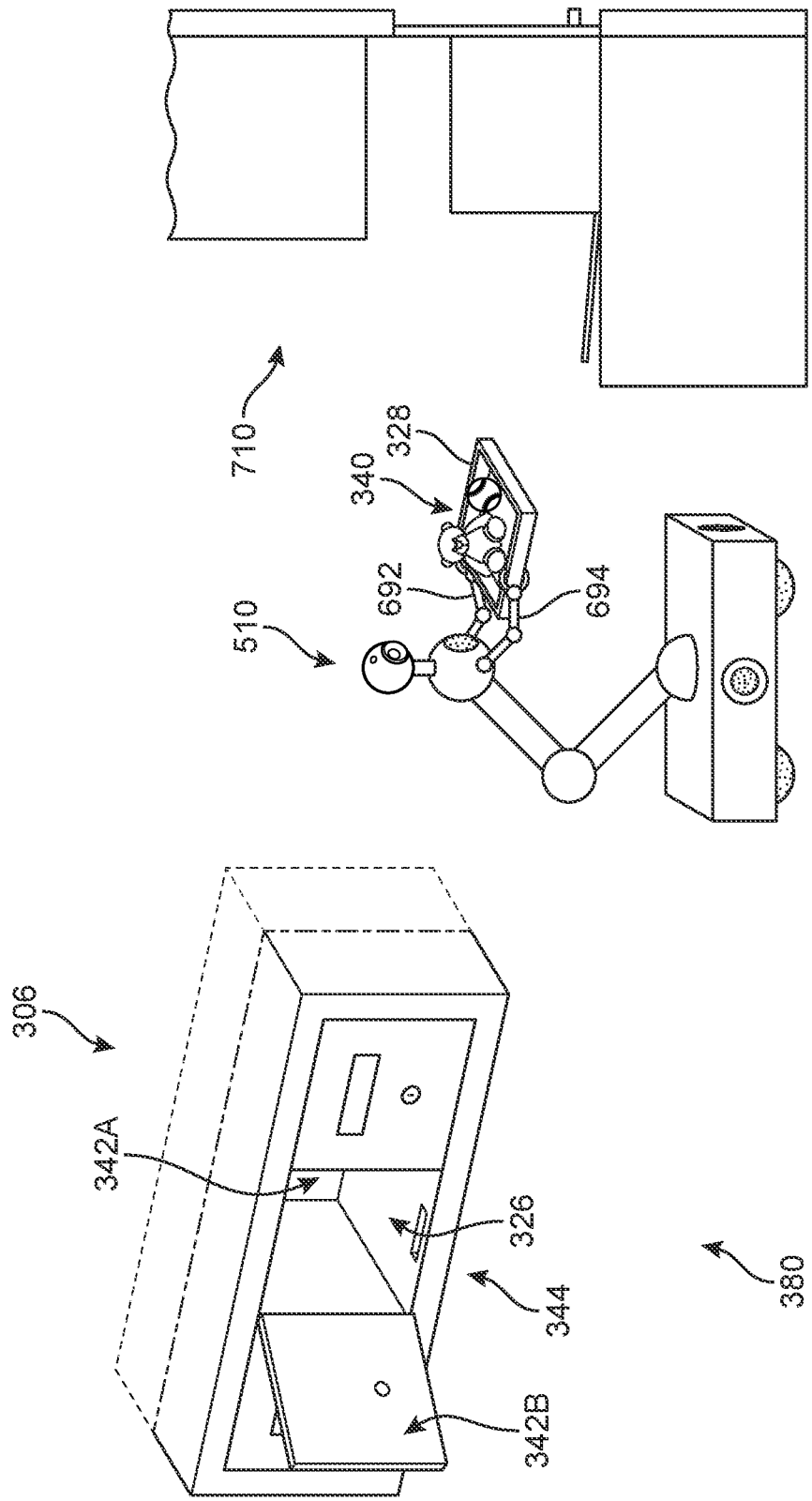
FIG. 7 shows the robot of FIGS. 5 and 6 approaching an examination area, according to an embodiment.

Referring now to FIG. 7, the second robot 510 maneuvers away from the SDB array 306 and moves to an optional examination and/or packaging station 710. In some embodiments, the station 710 can be used by the remote owner to more thoroughly examine the contents of the box via the robot. In another embodiment, the station 710 may represent a first stage of the delivery process for the items.

Figure 8:
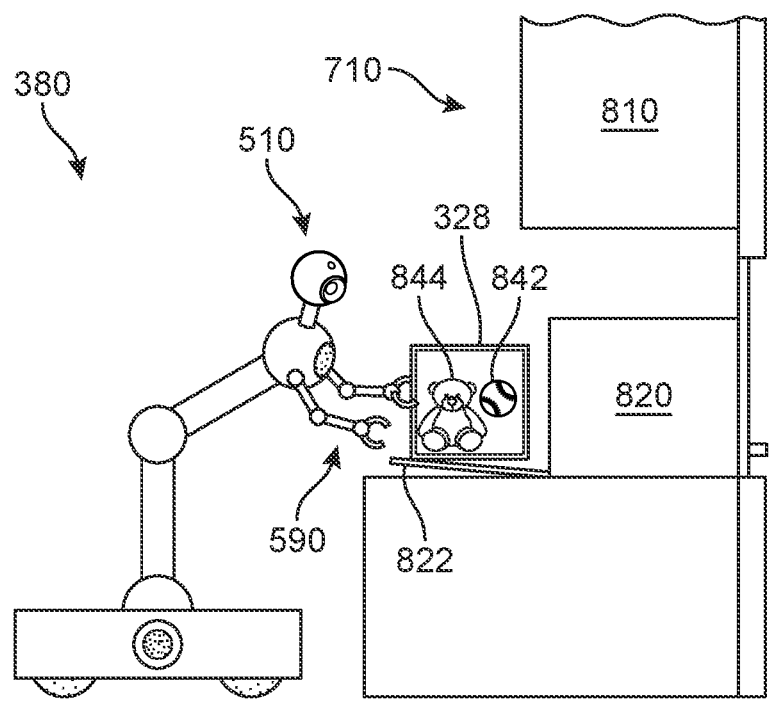
FIGS. 8 and 9 show the robot of FIG. 7 placing the contents on a table and then inserting the contents into a container, according to an embodiment.
Figure 9:
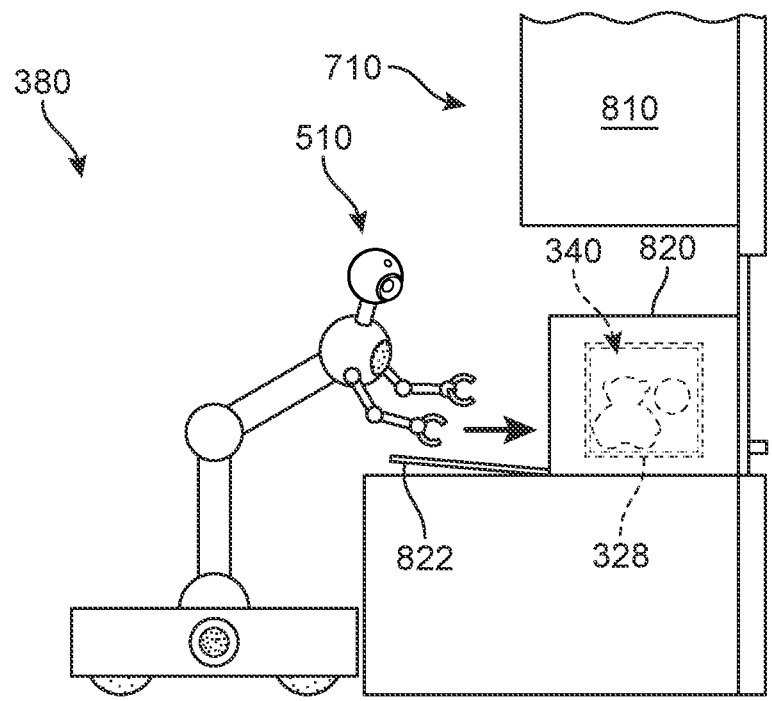

In FIG. 8, the second robot 510 places the tray 328 including a first item 842 and a second item 844 on a lid 822 of a container 820. The container 820 can be positioned on a table or other surface in advance, for example via a chute 810. In FIG. 9, the second robot 510 moves its arms to push and/or otherwise carry the tray 328 into the container 820. The container 820 can include provisions for receiving the contents securely, and for insulating or otherwise protecting fragile items.

Figure 10:
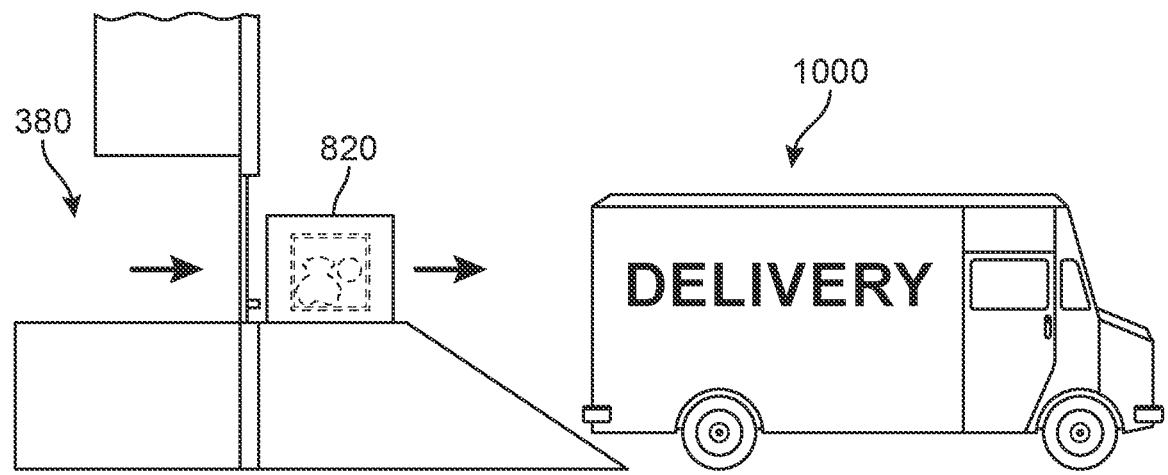
FIGS. 10 and 11 illustrate one example of the contents of the safety deposit box being shipped, according to an embodiment.
Figure 11:
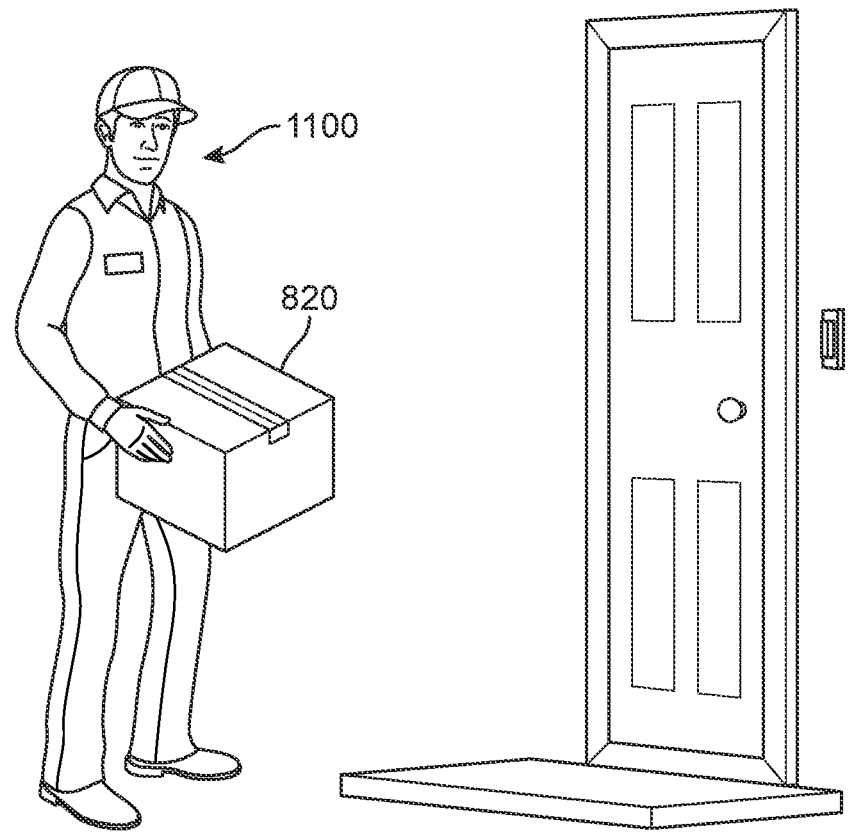

In FIG. 10, the container 820 has been sealed and can be automatically processed for delivery 1000. In different embodiments, the manner of delivery 1000 can vary widely, from a licensed human courier, to a generic shipping service, to an autonomous drone delivery service. The container 820 is transported from the location of the security deposit box installation to a remote location 1100 per the owner's request, as depicted in FIG. 11. It should be understood that the sequence of FIGS. 5-11 is for purposes of illustration, and the transfer of the items from the robot to a shipping container can vary from what is depicted here, with the understanding that there is minimal if any human interaction with the items from the time the door is opened to the time the package arrives at the owner's address, thereby significantly reducing the likelihood of either intentional or inadvertent tampering, damage, loss of privacy, or theft.

It should further be appreciated that the system described herein also includes provisions for returning the tray and/or contents to the safety deposit box. In different embodiments, the robot may be programmed to automatically return the tray and contents to the original safety deposit box, for example, by a reversal of its previous actions. In some embodiments, the user can request a termination of the access event, and the robot will respond by returning the items to the safety deposit box and re-locking the box. In one embodiment, the robot can be commanded to remove a single item from the safety deposit box and then immediately thereafter be programmed to close and lock the door of the safety deposit box (i.e., before moving to the examination area or packaging station).

Thus, a user may request remote access to view the contents of the safety deposit box, and then initiate a safe return of said contents via the robot. Furthermore, in order to ensure security of the contents, in cases where a user's connection is abruptly lost or there is no further communication from the user for a pre-selected period of time (e.g., 30 seconds-5 minutes), the robot is configured to automatically return the contents and re-lock the door, while continuing to record the entirety of the process. This type of protective response can also be automatically triggered should the system experience any type of fault or error.

Figure 12:
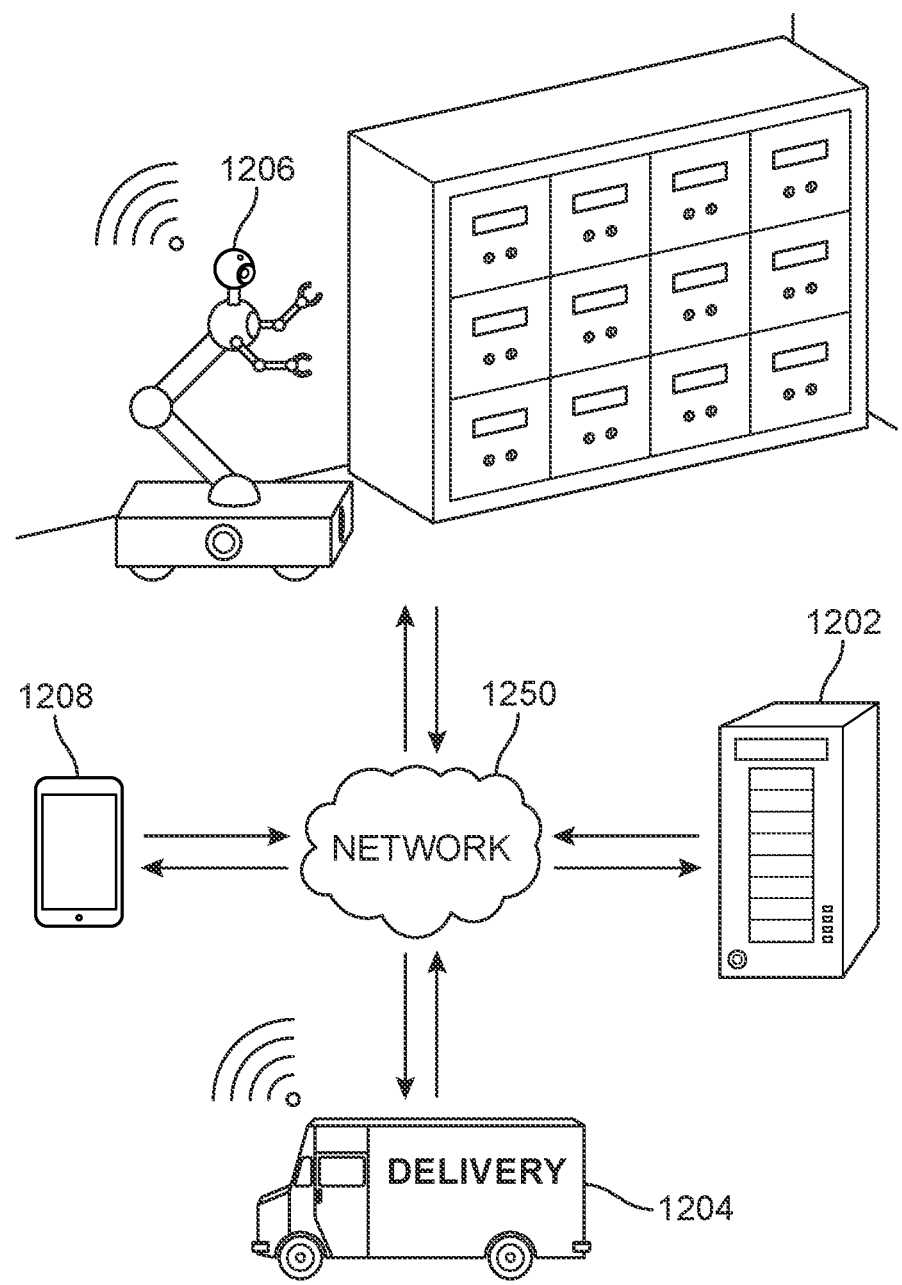
FIG. 12 is a schematic diagram showing communications between various components of a system for providing secure remote access to safety deposit boxes, according to an embodiment.

FIG. 12 is a schematic diagram showing communications over a network 1250 such as the Internet between users and various components of the system. Server 1202 may be located in a bank (or other institution) in the United States or Europe or elsewhere, for example. The user may request a remote access event over network 1250 using a laptop or mobile device 1208. Network 1250 may be the Internet, or it may be a telephone network, an RF network, or another type of communication system. Server 1202 can further be configured to schedule the delivery of the items with the delivery service 1204.

Figure 13:
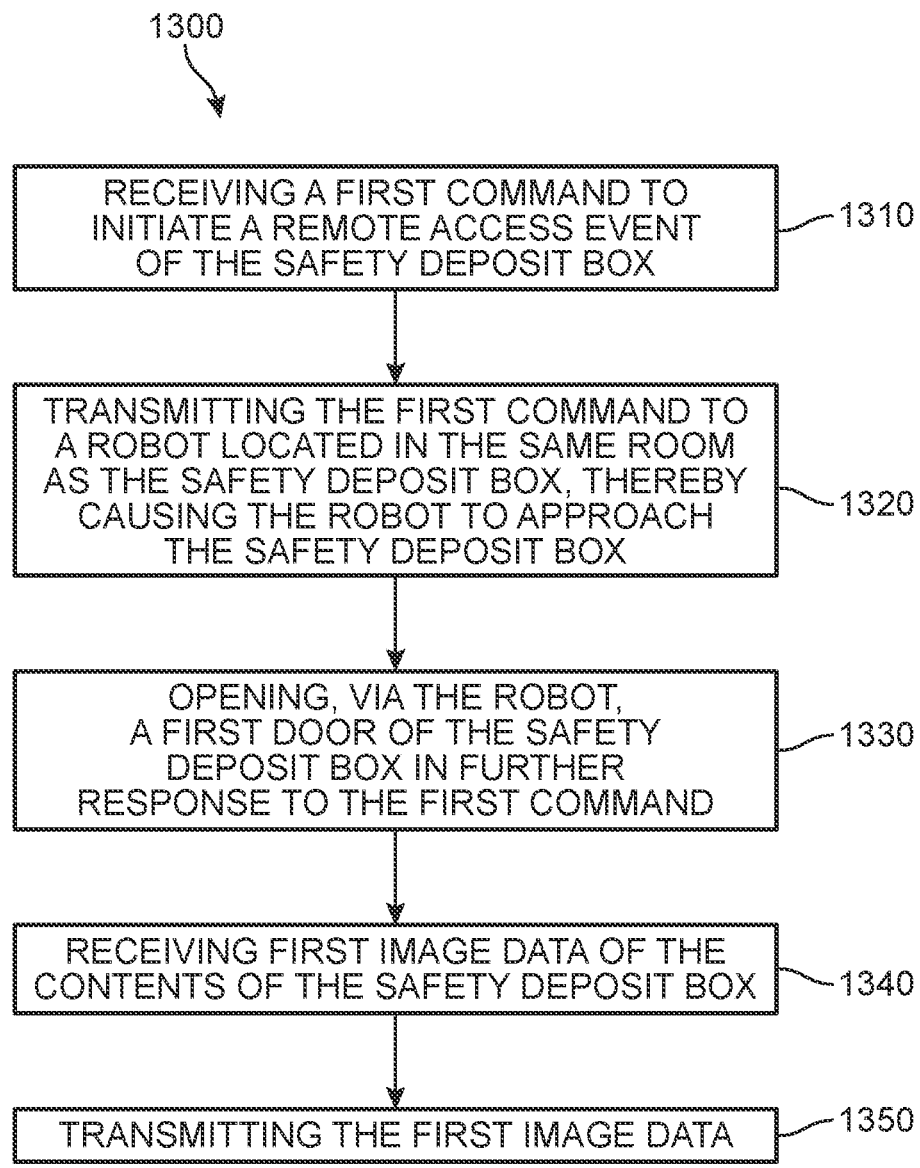
FIG. 13 is a flow chart depicting a process of providing remote access to contents of a safety deposit box, according to an embodiment.

FIG. 13 is a flow chart illustrating an embodiment of a method 1300 for providing remote access to contents of a safety deposit box. The method 1300 includes a first step 1310 of receiving, at a server and from a remote computing device, a first command to initiate a remote access event of the safety deposit box, and a second step 1320 of transmitting, from the server, the first command to a robot located in the same room as the safety deposit box, thereby causing the robot to approach the safety deposit box. The method 1300 further includes a third step 1330 of opening, via the robot, a first door of the safety deposit box in further response to the first command, and a fourth step 1340 of receiving, at the server and from a camera mounted on the robot, first image data of the contents of the safety deposit box. A fifth step 1350 includes transmitting, from the server and to the remote computing device, the first image data.

In different embodiments, imaging could be as part of the financial or insurance transaction being done as a block chain process. For example, where the document in the safety deposit box requires imaging for 'proof' or e-signature, or even a title sign-over (e.g., for a vehicle or other piece of property), that can be then mailed as specified by the business process or blockchain rules. Additionally, in some embodiments, a physical object that is stored using the disclosed systems could be imaged in three dimensions and a file created as either input for a 3D printer for remote reproduction, or for incorporation as its own NFT or other uses by the owner.

In other embodiments, the method may include additional steps or aspects. In some embodiments the method also includes steps of receiving, at the server and from the remote computing device, a second command to retrieve the contents of the safety deposit box and transmitting, from the server, the second command to the robot, thereby causing the robot to remove a tray from the safety deposit box in which at least a first item is disposed. In some cases, the method also includes steps of receiving, at the server and from the remote computing device, a third command to examine the contents of the safety deposit box, and transmitting, from the server, the third command to the robot, thereby causing the robot to carry the tray to an examination area spaced apart from the safety deposit box.

In some embodiments, the method also includes steps of receiving, at the server and from the remote computing device, a fourth command to reposition the first item of the safety deposit box, and transmitting, from the server, the fourth command to the robot, thereby causing the robot to grasp the first item with a first arm and rotate the first item. In another example, the method includes additional steps of receiving, at the server and from the camera, second image data showing the rotation of the first item, and transmitting, from the server, the second image data to the remote computing device. In one embodiment, the method can also include steps of receiving, at the server and from the remote computing device, a third command to prepare the contents of the safety deposit box for shipping, and transmitting, from the server, the third command to the robot, thereby causing the robot to carry the tray to a packaging station and insert the tray into a shipping container.

In another embodiment, the method can further include receiving, at the server and from the remote computing device, a first address, and transmitting, from the server, the address to the packaging station, thereby causing a packing label including the first address to be applied to the shipping container. In one example, the first door can only be unlocked by the robot. In another example, the safety deposit box further includes a second door that is accessible to the owner of the safety deposit box for local access events (and inaccessible to the robot). In some embodiments, the method also includes receiving, at the server and from the remote computing device, a second command to terminate the remote access event, and transmitting, from the server, the second command to the robot, thereby causing the robot to close and lock the first door with the contents inside of the safety deposit box. In addition, the method can include steps of receiving, at the server and from a sensor installed in the safety deposit box, a signal that the first door has been opened, and transmitting, from the server to the remote computing device, an alert indicating the safety deposit box has been opened.

As described herein, some of the proposed embodiments can be understood to include a safety deposit box facility or portion thereof. The facility includes a structure comprising at least a first safety deposit box including a first door that, when opened, provides access to contents of the first safety deposit box, a robot configured to receive a first remote command that causes the robot to unlock the first safety deposit box, open the first door, and retrieve the contents therein, and a camera mounted on the robot configured to capture and transmit real-time image data from the facility to a remote computing device.

In some embodiments, the first safety deposit box further includes a second door that is opposite to the first door and is inaccessible to the robot. In another embodiment, the first safety deposit box further includes a sensor that generates a signal when either the first door or the second door is opened, and the signal causes an alert to be presented via an application of the remote computing device. In one example, the robot is further configured to receive a second remote command that causes the robot to carry the contents to an examination area near the first safety deposit box. In some cases, the camera is configured to receive a third remote command that causes the camera to either zoom in or zoom out. In some embodiments, the facility also includes a packaging station in the same room as the safety deposit box, and the robot is further configured to receive a second remote command that causes the robot to carry the contents to the packaging station for insertion of the contents into a shipping container. Furthermore, in one embodiment, a device associated with the first safety deposit box container is configured to communicate with a remote server over the Internet. In another example, a remote server is configured to receive requests for appointments to initiate a remote access session and maintains a calendar of such appointments in order to ensure only one remote access session occurs at a time and commands received by the robot are directed to only one account (i.e., no overlapping remote sessions).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for providing remote access to contents of a safety deposit box associated with a registered owner, the method comprising:
   receiving, at a server and from a remote computing device, a first command to initiate a remote access event of the safety deposit box by the registered owner through a user interface of the registered owner;
   transmitting, from the server, the first command to a robot located in the same room as the safety deposit box, thereby causing the robot to approach the safety deposit box;
   opening, via the robot, a first door of the safety deposit box in further response to the first command;
   receiving, at the server and from a camera mounted on the robot, first image data of the contents of the safety deposit box; and
   transmitting, from the server and to the remote computing device, the first image data to a display of the user interface of the registered owner.

2. The method of claim 1, further comprising:
   receiving, at the server and from the remote computing device, a second command to retrieve the contents of the safety deposit box; and
   transmitting, from the server, the second command to the robot, thereby causing the robot to remove a tray from the safety deposit box in which at least a first item is disposed.

3. The method of claim 2, further comprising:
   receiving, at the server and from the remote computing device, a third command to examine the contents of the safety deposit box; and
   transmitting, from the server, the third command to the robot, thereby causing the robot to carry the tray to an examination area spaced apart from the safety deposit box.

4. The method of claim 3, further comprising:
   receiving, at the server and from the remote computing device, a fourth command to reposition the first item of the safety deposit box; and
   transmitting, from the server, the fourth command to the robot, thereby causing the robot to grasp the first item with a first arm and rotate the first item.

5. The method of claim 4, further comprising:
   receiving, at the server and from the camera, second image data showing the rotation of the first item; and
   transmitting, from the server, the second image data to the remote computing device.

6. The method of claim 2, further comprising:
   receiving, at the server and from the remote computing device, a third command to prepare the contents of the safety deposit box for shipping; and
   transmitting, from the server, the third command to the robot, thereby causing the robot to carry the tray to a packaging station and insert the tray into a shipping container.

7. The method of claim 6, further comprising:
   receiving, at the server and from the remote computing device, a first address; and
   transmitting, from the server, the address to the packaging station, thereby causing a packing label including the first address to be applied to the shipping container.

8. The method of claim 7, wherein the first door can only be unlocked via the robot.

9. The method of claim 8, wherein the safety deposit box further includes a second door that is accessible to the registered owner of the safety deposit box for local access events.

10. The method of claim 1, further comprising:
    receiving, at the server and from the remote computing device, a second command to terminate the remote access event; and
    transmitting, from the server, the second command to the robot, thereby causing the robot to close and lock the first door with the contents inside of the safety deposit box.

11. The method of claim 1, further comprising:
    receiving, at the server and from a sensor installed in the safety deposit box, a signal that the first door has been opened; and
    transmitting, from the server to the remote computing device, an alert indicating the safety deposit box has been opened.

12. A safety deposit box facility, the facility comprising:
    a wall defining an exterior room on a first side of the wall and an interior room on an opposite second side of the wall;
    at least a first safety deposit box extending through the wall from the first side to the second side, the first safety deposit box including a first door that, when opened, provides access to contents of the first safety deposit box, wherein the first door is accessible on the first side of the wall from the exterior room;
    the first safety deposit box further including a second door that, when opened, provides access to the contents of the first safety deposit box, wherein the second door is accessible on the second side of the wall from the interior room;
    a robot configured to receive a first remote command that causes the robot to unlock the first safety deposit box, open the second door, and retrieve the contents therein;

a camera mounted on the robot configured to capture and transmit real-time image data of the contents of the first safety deposit box from the facility to a remote computing device;

wherein the first door on the first side of the wall in the exterior room is accessible only by a human user;

wherein the second door on the second side of the wall in the interior room is accessible only by the robot; and wherein the human user is restricted from entering the interior room and wherein the robot is restricted from entering the exterior room.

13. The facility of claim 12, wherein the real-time image data of the contents of the first safety deposit box is transmitted from the robot to a user interface associated with a registered owner of the first safety deposit box.

14. The facility of claim 12, wherein the first safety deposit box further includes a sensor that generates a signal when either the first door or the second door is opened, and the signal causes an alert to be presented via an application of the remote computing device.

15. The facility of claim 12, wherein the robot is further configured to receive a second remote command that causes the robot to carry the contents to an examination area near the first safety deposit box.

16. The facility of claim 12, wherein the camera is configured to receive a third remote command that causes the camera to either zoom in or zoom out.

17. The facility of claim 12, further comprising a packaging station in the same room as the safety deposit box, and the robot is further configured to receive a second remote command that causes the robot to carry the contents to the packaging station for insertion of the contents into a shipping container.

18. The facility of claim 12, wherein a device associated with the first safety deposit box container is configured to communicate with a remote server over the Internet.

19. A system for providing remote access to contents of a safety deposit box associated with a registered owner, the system comprising a processor and machine-readable non-transitory media including instructions which, when executed by the processor, cause the processor to:

receive, at a server and from a remote computing device, a first command to initiate a remote access event of the safety deposit box by the registered owner through a user interface of the registered owner;

transmit, from the server, the first command to a robot located in the same room as the safety deposit box, thereby causing the robot to approach the safety deposit box;

open, via the robot, a first door of the safety deposit box in further response to the first command;

receive, at the server and from a camera mounted on the robot, first image data of the contents of the safety deposit box; and transmit, from the server and to the remote computing device, the first image data to a display of the user interface of the registered owner.

20. The system of claim 19, wherein the instructions further cause the processor to:

receive, at the server and from the remote computing device, a second command to retrieve the contents of the safety deposit box; and transmit, from the server, the second command to the robot, thereby causing the robot to remove a tray from the safety deposit box in which at least a first item is disposed.

* * * * *